(12) United States Patent
Mastroianni et al.

(10) Patent No.: US 8,008,413 B2
(45) Date of Patent: Aug. 30, 2011

(54) METHOD FOR PREPARING COPOLYMERS

(75) Inventors: Sergio Mastroianni, Lyons (FR); Stefan Klaus Spitzmesser, Brussels (BE)

(73) Assignee: Ineos Europe Limited, Hampshire (GB)

( * ) Notice: Subject to any disclaimer, the term of this patent is extended or adjusted under 35 U.S.C. 154(b) by 25 days.

(21) Appl. No.: 12/312,875

(22) PCT Filed: Nov. 23, 2007

(86) PCT No.: PCT/EP2007/062742
§ 371 (c)(1),
(2), (4) Date: Nov. 16, 2009

(87) PCT Pub. No.: WO2008/068148
PCT Pub. Date: Jun. 12, 2008

(65) Prior Publication Data
US 2010/0069587 A1    Mar. 18, 2010

(30) Foreign Application Priority Data
Dec. 5, 2006   (EP) .................................... 06256202

(51) Int. Cl.
*C08F 4/64* (2006.01)
*C08F 4/6592* (2006.01)
*B01J 31/22* (2006.01)

(52) U.S. Cl. ..... 526/161; 526/160; 526/348; 526/348.2; 526/943

(58) Field of Classification Search .................. 526/160, 526/161, 348, 348.2, 943
See application file for complete search history.

(56) References Cited

U.S. PATENT DOCUMENTS
7,012,121 B2 *   3/2006   Carnahan et al. ............. 526/134

FOREIGN PATENT DOCUMENTS
| WO | WO 00/71251 A1 | 11/2000 |
| WO | WO 2005/019275 A1 | 3/2005 |
| WO | WO 2006/060544 A1 | 6/2006 |

OTHER PUBLICATIONS
PCT International Preliminary Report on Patentability; PCT/EP2007/062742; Int'l Filing Date Nov. 23, 2007 (12 pgs).

* cited by examiner

*Primary Examiner* — Caixia Lu
(74) *Attorney, Agent, or Firm* — Nixon & Vanderhye

(57) ABSTRACT

A method for the preparation of copolymers of ethylene and α-olefins having a fraction (%) of the molecular weight component of >1,000,000 of less than 6% comprises polymerising ethylene and an α-olefin in the presence of a supported polymerisation catalyst system comprising (a) a transition metal compound (b) a porous support material, and (c) an activator characterized in that the support material has been (i) dried at a temperature in the range 0° C. to 195° C. in an inert atmosphere, and (ii) treated with an organometallic compound. The resultant supported catalyst systems show improved productivity and allow for control of the resultant polymer properties. Particularly preferred supported catalyst systems are those comprising metallocene complexes.

17 Claims, No Drawings

METHOD FOR PREPARING COPOLYMERS

This application is the U.S. National Phase of International Application PCT/EP2007/062742, filed 23 Nov. 2007, which designated the U.S. PCT/EP2007/062742 claims priority to European Application No. 06256202.0, filed 5 Dec. 2006. The entire content of these applications are incorporated herein by reference.

The present invention relates to a method for preparing copolymers of ethylene and α-olefins having from 3 to 10 carbon atoms by use of supported polymerisation catalyst systems and in particular to a method for the control of a molecular weight component of the copolymers.

In recent years there have been many advances in the production of polyolefin homopolymers and copolymers due to the introduction of metallocene catalysts. Metallocene catalysts offer the advantage of generally a higher activity than traditional Ziegler catalysts and are usually described as catalysts which are single site in nature. There have been developed several different families of metallocene complexes. In earlier years catalysts based on bis(cyclopentadienyl) metal complexes were developed, examples of which may be found in EP 129368 or EP 206794. More recently complexes having a single or mono cyclopentadienyl ring have been developed. Such complexes have been referred to as 'constrained geometry' complexes and examples of these complexes may be found in EP 416815 or EP 420436. In both of these complexes the metal atom e.g. zirconium is in the highest oxidation state.

Other complexes however have been developed in which the metal atom may be in a reduced oxidation state. Examples of both the bis(cyclopentadienyl) and mono (cyclopentadienyl) complexes have been described in WO 96/04290 and WO 95/00526 respectively.

The above metallocene complexes are utilised for polymerisation in the presence of a cocatalyst or activator. Typically activators are aluminoxanes, in particular methyl aluminoxane or alternatively may be compounds based on boron compounds. Examples of the latter are borates such as trialkyl-substituted ammonium tetraphenyl- or tetrafluorophenyl-borates or triarylboranes such as tris(pentafluorophenyl) borane. Catalyst systems incorporating borate activators are described in EP 561479, EP 418044 and EP 551277.

The above metallocene complexes may be used for the polymerisation of olefins in solution, slurry or gas phase. When used in the slurry or gas phase the metallocene complex and/or the activator are suitably supported. Typical supports include inorganic oxides e.g. silica or polymeric supports may alternatively be used.

Examples of the preparation of supported metallocene catalysts for the polymerisation of olefins may be found in WO 94/26793, WO 95/07939, WO 96/00245, WO 96/04318, WO 97/02297 and EP 642536.

The support material may be subjected to a heat treatment (calcination) and/or chemical treatment to reduce the water content or the hydroxyl content of the support material. Typically chemical dehydration agents are reactive metal hydrides, aluminium alkyls and halides.

Typically the support material may be subjected to treatment at 200 to 850° C. in an inert atmosphere under reduced pressure.

We have now surprisingly found that by decreasing the drying/calcination temperature the catalyst productivity of the resultant supported polymerisation catalysts may be significantly increased and in particular the control of certain properties of the resultant copolymers may be achieved.

In particular it has been found that the fraction of the high molecular weight component (>1,000,000) of the resultant copolymers may be decreased significantly.

Thus according to the present invention there is provided a method for the preparation of copolymers of ethylene and α-olefins having a fraction (%) of the molecular weight component of >1,000,000 of less than 6%
said method comprising polymerising ethylene and an α-olefin in the presence of a supported polymerisation catalyst system comprising
(a) a transition metal compound,
(b) a porous support material, and
(c) an activator,
characterized in that the support material has been
(i) dried at a temperature in the range 0° C. to 195° C. in an inert atmosphere, and
(ii) treated with an organometallic compound, Preferably the fraction (%) of the molecular weight component of >1,000,000 is less than 4% and most preferably is less than 2.5%.

By dried is meant the partial or total removal of volatile elements, for example water, from the support material. The volatile elements may be removed by passing nitrogen over the support material or more preferably by heating the support material.

A preferred method of drying is by heating the support at a temperature in the range 25° C. to 195° C., more preferably in the range 30° C. to 180° C. and most preferred in the range 30 to 95° C.

Suitable porous support materials include inorganic metal oxides or alternatively polymeric supports may be used for example polyethylene, polypropylene, clays, zeolites, etc.

The most preferred support material for use with the supported catalysts according to the method of the present invention is silica. Suitable silicas include Ineos ES70 and Grace Davison 948 silicas.

The porous supports are pretreated with the organometallic compound preferably an organoaluminium compound and most preferably a trialkylaluminium compound in a dilute solvent.

The support material may be pretreated with the organometallic compound at a temperature of −20° C. to 150° C. and preferably at 20° C. to 100° C. and most preferably at room temperature.

Preferred organoaluminium compounds are trialkyl aluminium compounds containing from 1 to 20 carbons atoms in each alkyl group. Preferred trialkylaluminium compounds are trimethyl aluminium, triethylaluminium, triisopropylaluminium and triisobutylaluminium.

A particularly preferred trialkylaluminium compound is triisobutylaluminium.

Examples of suitable transition metal compounds are for example derivatives of Group IIIA, IVA or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group IVB of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

Preferred transition metal compound for use in the preparation of the supported catalysts of the present invention is a bulky ligand compound also referred to as a metallocene complex containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

$$L_xMQ_n$$

where L is a cyclopentadienyl ligand, M is a Group IVA metal, Q is a leaving group and x and n are dependent upon the oxidation state of the metal.

Typically the Group IVA metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged e.g. bis(cyclopentadienyl)zirconium dichloride, bis(pentamethyl)cyclopentadienyl dichloride, or may be bridged e.g. ethylene bis(indenyl)zirconium dichloride or dimethylsilyl(indenyl)zirconium dichloride.

Other suitable bis(cyclopentadienyl)metallocene complexes are those bis(cyclopentadienyl)diene complexes described in WO 96/04290. Examples of such complexes are bis(cyclopentadienyl)zirconium (2,3-dimethyl-1,3-butadiene) and ethylene bis(indenyl)zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

$$CpMX_n$$

wherein Cp is a single cyclopentadienyl or substituted cyclopentadienyl group optionally covalently bonded to M through a substituent, M is a Group VIA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

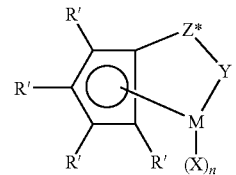

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms,
Y is —O—, —S—, —NR*—, —PR*—,
M is hafnium, titanium or zirconium,
Z* is SiR*$_2$, CR*$_2$, SiR*$_2$SIR*$_2$, CR*$_2$CR*$_2$, CR*=CR*, CR*$_2$SIR*$_2$, or
GeR*$_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system
and n is 1 or 2 depending on the valence of M.

Examples of suitable monocyclopentadienyl complexes are (tert-butylamido) dimethyl(tetramethyl-$\eta^5$-cyclopentadienyl)silanetitanium dichloride and (2-methoxyphenylamido) dimethyl(tetramethyl-$\eta^5$-cyclopentadienyl)silanetitanium dichloride.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium [tri (tertiary butyl)phosphinimine]dichloride.

Another suitable type of transition metal compound are monocyclopentadienyl complexes comprising heteroallyl moieties such as zirconium (cyclopentadienyl)tris(diethylcarbamates) as described in U.S. Pat. No. 5,527,752 and WO 99/61486.

Particularly preferred metallocene complexes for use in the preparation of the supported catalysts of the present invention may be represented by the general formula:

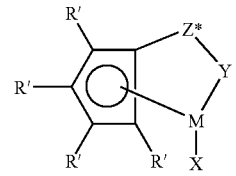

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral $\eta^4$ bonded diene group having up to 30 non-hydrogen atoms, which forms a π-complex with M;

Y is —O—, —S—, —NR*—, —PR*—,

M is titanium or zirconium in the +2 formal oxidation state;

Z* is $SiR^*_2$, $CR^*_2$, $SiR^*_2SIR^*_2$, $CR^*_2CR^*_2$, $CR^*=CR^*$, $CR^*_2SIR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from V' (when R* is not hydrogen), or an R* group from Z* and an R* group from Y form a ring system.

Examples of suitable X groups include s-trans-$\eta^4$-1,4-diphenyl-1,3-butadiene, s-trans-$\eta^4$-3-methyl-1,3-pentadiene; s-trans-$\eta^4$-2,4-hexadiene; s-trans-$\eta^4$-1,3-pentadiene; s-trans-$\eta^4$-1,4-ditolyl-1,3-butadiene; s-trans-$\eta^4$-1,4-bis(trimethylsilyl)-1,3-butadiene; s-cis-$\eta^4$-3-methyl-1,3-pentadiene; s-cis-$\eta^4$-1,4-dibenzyl-1,3-butadiene; s-cis-$\eta^4$-1,3-pentadiene; s-cis-$\eta^4$-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire $C_5R'_4$ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R$^{\parallel}$)— or —P(R$^{\parallel}$)— wherein R$^{\parallel}$ is $C_{1-10}$ hydrocarbyl.

Most preferred complexes are amidosilane- or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-$\eta^5$-cyclopentadienyl)dimethyl silanetitanium-$\eta^4$-1,3-pentadiene.

The preferred supported polymerisation catalyst systems for use in the method of the present invention comprise
(a) a metallocene,
(b) a porous support material, and
(c) an activator,
characterized in that the support material has been
(i) dried at a temperature in the range 0° C. to 195° C. in an inert atmosphere and
(ii) treated with an organometallic compound.

The preferred method of drying is by heating the support at a temperature in the range 25° C. to 195° C., more preferably in the range 30° C. to 180° C. and most preferred in the range 30 to 95° C.

Suitable activators for use in the preparation of the supported polymerisation catalysts of the present invention are those typically used with the aforementioned transition metal compounds.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable activators are organoboron compounds in particular triarylboron compounds. A particularly preferred triarylboron compound is tris(pentafluorophenyl) borane.

Other compounds suitable as activators are compounds which comprise a cation and an anion. The cation is typically a Bronsted acid capable of donating a proton and the anion is typically a compatible non-coordinating bulky species capable of stabilizing the cation.

Such activators may be represented by the formula:

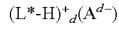

$(L^*-H)^+_d(A^{d-})$ wherein

L* is a neutral Lewis base $(L^*-H)^+_d$ is a Bronsted acid $A^{d-}$ is a non-coordinating compatible anion having a charge of d⁻, and d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations e.g. triethylanunonium, tripropyl ammonium, tri(n-butyl)ammonium and similar. Also suitable are N,N-dialkylanilinium cations such as N,N-dimethylanilinium cations.

The preferred ionic compounds used as activators are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate.

A preferred type of activator suitable for use with the metallocene complexes comprise ionic compounds comprising a cation and an anion wherein the anion has at least one substituent comprising a moiety having an active hydrogen.

Suitable activators of this type are described in WO 98/27119 the relevant portions of which are incorporated herein by reference.

Examples of this type of anion include:
triphenyl(hydroxyphenyl)borate
tri(p-tolyl)(hydroxyphenyl)borate
tris(pentafluorophenyl)(hydroxyphenyl)borate
tris(pentafluorophenyl)(4-hydroxyphenyl)borate Examples of suitable cations for this type of activator include triethylammonium, triisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogentated tallow alkyl)methylammonium and similar.

Particular preferred activators of this type are alkylammonium tris(pentafluorophenyl) 4-(hydroxyphenyl)borates. A particularly preferred activator is bis(hydrogenated tallow alkyl)methyl ammonium tris(pentafluorophenyl)(4-hydroxyphenyl)borate.

With respect to this type of activator, a preferred compound is the reaction product of an alkylammonium tris(pentafluorophenyl)-4-(hydroxyphenyl)borate and an organometallic compound, for example triethylaluminium or an aluminoxane such as tetraisobutylaluminoxane.

The method of the present invention may also comprise the addition of a polymerisable monomer during the supported catalyst preparation. Our earlier applications WO 04/020487 and WO 05/019275 describe supported catalyst compositions wherein a polymerisable monomer is used during the catalyst preparation.

Polymerisable monomers suitable for use in the method of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene/1-hexene.

The preferred polymerisable monomer for use in this aspect of the present invention is 1-hexene.

The polymerisable monomer is suitably used in liquid form or alternatively may be used in a suitable solvent. Suitable solvents include for example heptane.

The polymerisable monomer may be added to the activator before addition of the metallocene complex or alternatively the metallocene complex may be pretreated with the polymerisable monomer before contact with the activator.

Preferred supported polymerisation catalyst systems for use in the method of the present invention comprise
 (a) a metallocene,
 (b) an activator,
 (c) a polymerisable monomer, and
 (d) a porous support material
characterized in that the support material has been
 (i) dried at a temperature in the range 0° C. to 195° C. in an inert atmosphere and
 (ii) treated with an organometallic compound.

The preferred method of drying is by heating the support at a temperature in the range 25° C. to 195° C., more preferably in the range 30° C. to 180° C. and most preferred in the range 30° C. to 95° C.

The supported polymerization catalysts used in the method of the present invention may suitably be prepared by contacting the catalyst components in a suitable solvent.

A preferred method for the preparation of the preferred supported polymerisation catalysts systems comprises combining in a suitable solvent
 (a) a metallocene,
 (b) an activator, and
 (c) a porous support
characterized in that the support material has been
 (i) dried at a temperature in the range 0° C. to 195° C. in an inert atmosphere, and
 (ii) treated with an organometallic compound.

The preferred method for the preparation of the supported polymerisation catalyst systems comprises the following steps
 (a) contacting a porous support material with an activator in a suitable solvent,
 (b) addition of a metallocene to the supported activator solution prepared in step (a), and
 (c) removal of the solvent.
characterised in that the porous support material has been
 (i) dried at a temperature in the range 0° C. to 195° C. in an inert atmosphere, and
 (ii) treated with an organometallic compound.

The preferred method for dying is by heating the support at a temperature in the range 25° C. to 195° C., more preferably in the range 30° C. to 180° C. and most preferred in the range 30° C. to 95° C.

A most preferred method for the preparation of the supported polymerisation catalyst system used in the method of the present invention comprises the following steps:
 (i) drying a porous support material at a temperature in the range 0° C. to 195° C. in an inert atmosphere,
 (ii) addition of an organometallic compound in a suitable solvent,
 (iii) removal of the solvent,
 (iv) addition of an activator in a suitable solvent to the support material,
 (v) addition of a metallocene in a suitable solvent, and
 (vi) removal of the solvent.

The method of the present invention is most suitable for the polymerisation of ethylene and α-olefin monomers having $C_3$ to $C_{10}$ carbon atoms.

Preferred α-olefin monomers are 1-butene, 1-hexene, 4-methyl-1-pentene or 1-octene.

A particularly preferred α-olefin monomer is 1-hexene.

The method of the present invention is most suitable for use in slurry or gas phase processes.

A slurry process typically uses an inert hydrocarbon diluent and temperatures from about 0° C. up to a temperature just below the temperature at which the resulting polymer becomes substantially soluble in the inert polymerisation medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerisation processes.

Gas phase processes for the polymerisation of olefins, especially for the copolymerisation of ethylene and α-olefins for example 1-butene, 1-hexene, 4-methyl-1-pentene and 1-octene are well known in the art.

Typical operating conditions for the gas phase are from 20° C. to 100° C. and most preferably from 40° C. to 85° C. with pressures from subatmospheric to 100 bar.

Particularly preferred gas phase processes are those operating in a fluidised bed. Examples of such processes are described in EP 89691 and EP 699213 the latter being a particularly preferred process for use with the supported catalysts of the present invention.

The supported polymerization catalysts of the present invention typically show an improved productivity of almost 50%.

The fraction (%) of the molecular weight component of >1,000,000 in the copolymer is determined by analysis of the copolymer prepared by use of the aforementioned supported catalyst system in the absence of the activator. In this way the molecular weight component >1,000,000 may easily be observed and not obscured by the lower molecular weight components produced by copolymerization in the presence of the fully formulated catalyst system.

The determination of the fraction (%) of the molecular weight component of >1,000,000 is suitably performed by Gel Permeation Chromatography (GPC).

Whilst not wishing to be bound by theory the present inventors believe that it is the molecular weight component >1,000,000 that contributes to the formation of gels in films prepared from copolymers of ethylene and α-olefins.

Accordingly the method of the present invention has the advantage of providing copolymers of ethylene and α-olefins which may be suitably formed into films having reduced gels.

The present invention will now be further illustrated by reference to the following examples.

EXAMPLES

| Abbreviations | |
|---|---|
| TEA | triethylaluminium |
| TiBA | triisobutylaluminium |
| Ionic Compound A | $[N(H)Me(C_{18-22}H_{37-45})_2][B(C_6F_5)_3(p\text{-}OHC_6H_4)]$ |
| Complex A | $(C_5Me_4SiMe_2N^tBu)Ti(\eta^4\text{-}1,3\text{-pentadiene})$ |

Example 1

Silica Calcinations and Passivation with TEA 15 g of silica Sylopol 948 was transferred in to a quartz reactor in a vertical oven and fluidised under nitrogen. The temperature was increased by 10° C./minutes and was maintained at the targeted value (see below) for 5 h. The reactor was the allowed to cool down to room temperature and the calcined silica was collected and kept under nitrogen atmosphere. This operation was repeated for each targeted calcinations temperature.

To 5 g of each calcined silica was added 30 ml of hexane followed by 9 ml of 1M hexane solution of TEA. The mixture was allowed to react for 1 hour the solid fraction was washed 8 times with 50 ml of hexane and finally dried under vacuum. In all cases a free flowing powder was obtained.

TABLE 1

| Calcination temperature (° C.) | Silica/TEA reference |
|---|---|
| 30 | A |
| 150 | B |
| 180 | C |
| 250 | D (comparative) |

Example 2

To 1.67 ml (0.12 mmol) of a toluene solution of Ionic Compound A (9.24% wt) was added 0.12 ml (0.12 mmol) of 1M hexane solution of TEA and allowed to react for 10 minutes. This solution was then added to 2.0 g of support A and the mixture was well agitated until no lumps were visible and was allowed to stand for 30 min.

To 0.49 ml of 1-hexene (molar ratio 1-hexene/Ti~35) was added 0.55 ml (0.11 mmol) of an heptane solution of Complex A (10.4% wt) and the obtained solution was added to the above support. The mixture was well agitated for 30 min and finally dried under vacuum. A free flowing green powder was obtained

Example 3

To 1.67 ml (0.12 mmol) of a toluene solution of Ionic Compound A (9.24% wt) was added 0.12 ml (0.12 mmol) of 1M hexane solution of TEA and allowed to react for 10 minutes. This solution was then added to 2.0 g of support B and the mixture was well agitated until no lumps were visible and was allowed to stand for 30 min.

To 0.49 ml of 1-hexene (molar ratio 1-hexene/Ti~35) was added 0.55 ml (0.11 mmol) of an heptane solution of Complex A (10.4% wt) and the obtained solution was added to the above support. The mixture was well agitated for 30 min and finally dried under vacuum. A free flowing green powder was obtained

Example 4

To 1.67 ml (0.12 mmol) of a toluene solution of Ionic Compound A (9.24% wt) was added 0.12 ml (0.12 mmol) of 1M hexane solution of TEA and allowed to react for 10 minutes. This solution was then added to 2.0 g of support C and the mixture was well agitated until no lumps were visible and was allowed to stand for 30 min.

To 0.49 ml of 1-hexene (molar ratio 1-hexene/Ti~35) was added 0.55 ml (0.11 mmol) of an heptane solution of Complex A (10.4% wt) and the obtained solution was added to the above support. The mixture was well agitated for 30 min and finally dried under vacuum. A free flowing green powder was obtained.

Example 5

Comparative

To 1.67 ml (0.12 mmol) of a toluene solution of Ionic Compound A (9.24% wt) was added 0.12 ml (0.12 mmol) of 1M hexane solution of TEA and allowed to react for 10 minutes. This solution was then added to 2.0 g of support D and the mixture was well agitated until no lumps were visible and was allowed to stand for 30 min.

To 0.49 ml of 1-hexene (molar ratio 1-hexene/Ti~35) was added 0.55 ml (0.11 mmol) of an heptane solution of Complex A (10.4% wt) and the obtained solution was added to the above support. The mixture was well agitated for 30 min and finally dried under vacuum. A free flowing green powder was obtained Polymerisation Runs The above catalysts were tested for ethylene—1-hexene copolymerisation in an agitated dried phase reactor under the following conditions:
 seed bed: dried NaCl (70 g)
 scavenger: TEA treated silica (0.15 g)
 PC2: 10 b
 C6/C2 (% vol)=0.6
 H2/C2 (% vol)=0.22
 T°=80° C.
 run length: 80 minutes At the end of the run the reactor content was washed several times with water to eliminate the salt bed and the obtained polymer was finally dried at 45° C. overnight The polymerisation results are summarised in the following table:

TABLE 2

| Catalyst | Silica calcination Temperature °C. | Catalyst injected Mg | Production g | Yield g/g |
|---|---|---|---|---|
| Example 2 | 30 | 19.5 | 26.3 | 1350 |
| Example 3 | 150 | 20.5 | 25.7 | 1250 |
| Example 4 | 180 | 21.6 | 26.4 | 1220 |
| Example 5 (comparative) | 250 | 21.5 | 19.8 | 920 |

Example 6

Preparation of Supports 5 g of silica D948, previously calcined at a given temperature (see table below) for 5 hours under nitrogen, were slurried in 50 ml of hexane. 9 ml of a 1 M solution of an aluminium alkyl (see below) were slowly added at room temperature and the mixture was allowed to react for one hour.

The solid was then washed 8 times with 50 ml of hexane before drying under vacuum. A free flowing powder was obtained.

TABLE 3

| Support N° | Calcination temperature | Alkyl aluminium |
|---|---|---|
| 1 | 250° C. | TEA |
| 2 | 180° C. | TEA |
| 3 | 180° C. | TiBA |
| 4 | 150° C. | TEA |
| 5 | 30° C. | TEA |

Example 7

General Preparation Description of Catalysts Without Activator

To a known quantity (see table below) of support described above was added a precise volume of Complex A solution in heptane (10.4% wt). The mixture was well agitated until no lumps were visible and then dried under vacuum. A free flowing powder was obtained in all cases.

TABLE 4

| Catalyst code | Support | Quantity of support (g) | Quantity of Complex A (ml) |
|---|---|---|---|
| A (comparative) | 1 | 2 | 1.0 |
| B (inventive) | 2 | 2.98 | 1.48 |
| C (inventive) | 3 | 2 | 1.0 |
| D (inventive) | 4 | 2.03 | 1.04 |
| E (inventive) | 5 | 2 | 1 |

Example 8

Polymerisation Results

The above catalysts were tested for ethylene—1-hexene copolymerisation in an agitated dried phase reactor (270 ml reactor volume) under the following conditions:
seed bed: dried NaCl (70 g)
scavenger: TEA treated silica (0.15 g)
PC2: 10 b
C6/C2 (% vol)=0.8
H2/C2 (% vol)=0.45
T°=80° C.
run length: 120 minutes At the end of the run the reactor content was washed several times with water to eliminate the salt bed and the obtained polymer was finally dried at 45° C. overnight.

TABLE 5

| Run | Catalyst | Quantity of catalyst used (mg) | Mass of Polymer formed (g) | Prod (g/g · h) | Mn | Mw | Fraction (%) of Mw > 1,000,000 |
|---|---|---|---|---|---|---|---|
| 1 | A | 164 | 0.736 | 2.24 | 13200 | 286700 | 8.2 |
| 2 | A | 170 | 1.08 | 3.18 | 24700 | 350600 | 9.2 |
| 3 | A | 163 | 0.667 | 2.05 | 12300 | 293400 | 8.5 |
| 4 | B | 160 | 0.73 | 2.28 | 14500 | 129200 | 2.4 |
| 5 | B | 163 | 1.5 | 4.62 | 11800 | 149900 | 3.5 |
| 6 | C | 164 | 3.2 | 9.8 | 22000 | 115200 | 1.6 |
| 7 | C | 163 | 5.2 | 15.8 | 16500 | 79700 | 0.2 |
| 8 | D | 150 | 1.23 | 4.1 | 11900 | 127400 | 2.3 |
| 9 | D | 155 | 1.25 | 4 | 11400 | 121900 | 2.2 |
| 10 | E | 128 | 1.49 | 5.8 | 13000 | 112600 | 1.5 |

From the results in Table 5 it is clear that the fraction of the molecular weight component >1,000,000 is significantly reduced when the copolymers are prepared by use of the method of the present invention. In addition it may also be observed that in runs 6 and 7 (using a catalyst prepared by use of the preferred organoaluminium compound—trisisobutylaluminium) the productivity is also improved.

Polymer Properties

Gel Permeation Chromatography Analysis for Molecular Weight Distribution Determination Apparent molecular weight distribution and associated averages, uncorrected for long chain branching, were determined by Gel Permeation Chromatography using a PL220, with 1 PL HTS-B columns and a differential refractometer detector. The solvent used was 1,2,4 Trichlorobenzene at 160° C., which is stabilised with Ionol CP, of 1 g/litre concentration. Polymer solutions of 0.4 g/litre concentration were prepared at 160° C. for two hour with stirring. The nominal injection volume was set at 50l and the nominal flow rate was 1 ml/min.

A relative calibration was constructed using 10 narrow molecular weight linear polystyrene standards (Easical system):

| PS standard | Molecular weight |
|---|---|
| 1a | 7500000 |
| 2a | 841700 |
| 3a | 143400 |
| 4a | 31420 |
| 5a | 2930 |
| 1b | 2560000 |
| 2b | 280500 |
| 3b | 63350 |
| 4b | 9920 |
| 5b | 580 |

The PS molecular weight was then converted to PE equivalent using the following Mark Houwink parameters $k_{ps}=1.21 \times 10^{-4}$, $\alpha_{ps}=0.707$, $k_{pe}=4.06 \cdot 10^{-4}$, $\alpha_{pe}=0.725$. All the calculations are done with GPC online from Polymer labs.
Determination of % Fraction of Mw>1,000,000

The fraction (%) of the molecular weight component of >1,000,000 is obtained from the GPC and is equivalent to the value for the cumulative peak height for the first molecular weight fraction >1,000,000.

The invention claimed is:

1. A method for the preparation of copolymers of ethylene and α-olefins having a fraction (%) of the molecular weight component of >1,000,000 of less than 6% said method comprising polymerising ethylene and an α-olefin in the presence of a supported polymerisation catalyst system comprising
   (a) a transition metal compound,
   (b) a porous support material, and
   (c) an activator,
   characterized in that the support material has been
   (i) dried at a temperature in the range 0° C. to 195° C. in an inert atmosphere, and
   (ii) treated with an organometallic compound.

2. A method according to claim 1 wherein the fraction (%) of the molecular weight component of >1,000,000 is less than 4%.

3. A method according to claim 1 wherein the fraction (%) of the molecular weight component of >1,000,000 is less than 2.5%.

4. A method according to claim 1 wherein the support material has been heated at a temperature in the range 25° C. to 195° C.

5. A method according to claim 1 wherein the support material has been heated at a temperature in the range 30° C. to 180° C.

6. A method according to claim 1 wherein the support material has been heated at a temperature in the range 30° C. to 95° C.

7. A method according to claim 1 wherein the support material is silica.

8. A method according to claim 1 wherein the organometallic compound is an organoaluminium compound.

9. A method according to claim 8 wherein the organoaluminium compound is a trialkylaluminium compound.

10. A method according to claim 9 wherein the trialkylaluminium compound is trisisobutylaluminium.

11. A method according to claim 1 wherein the support material is treated with the organometallic compound at a temperature in the range 20° C. to 100° C.

12. A method according to claim 11 wherein the support material is treated with the organometallic compound at room temperature.

13. A method according to claim 1 wherein the transition metal compound is a metallocene.

14. A method according to claim 13 wherein the metallocene has the general formula

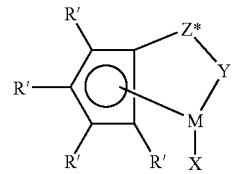

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;
X is a neutral $\eta^4$ bonded diene group having up to 30 non-hydrogen atoms, which forms a π-complex with M;
Y is —O—, —S—, —NR*—, —PR*—,
M is titanium or zirconium in the +2 formal oxidation state;
Z* is SiR*$_2$, CR*$_2$, SiR*$_2$SIR*$_2$, CR*$_2$CR*$_2$, CR*═CR*, CR*$_2$SiR*$_2$, or
GeR*$_2$, wherein:
R* each occurrence is independently hydrogen, or a member selected from hydrocarbyl, silyl, halogenated alkyl, halogenated aryl, and combinations thereof, said
R* having up to 10 non-hydrogen atoms, and optionally, two R* groups from Z* (when R* is not hydrogen), or an R* group from Z* and an R* group from Y form a ring system.

15. A method for the preparation of a supported polymerization catalyst system suitable for use in the method according to claim 13 said method comprising the following steps:
   (i) drying a porous support material at a temperature in the range 0° C. to 195° C. in an inert atmosphere,
   (ii) addition of an organometallic compound in a suitable solvent,
   (iii) removal of the solvent,
   (iv) addition of an activator in a suitable solvent to the support material,
   (v) addition of a metallocene in a suitable solvent, and
   (vi) removal of the solvent.

16. A method according to claim 1 wherein the α-olefin is 1-butene, 1-hexene, 4-methyl-1-pentene or 1-octene.

17. A method according to claim 1 wherein the ethylene and α-olefin are polymerized in the slurry or the gas phase.

* * * * *